United States Patent
Suzuki et al.

(10) Patent No.: US 9,947,445 B2
(45) Date of Patent: Apr. 17, 2018

(54) R-T-B BASED PERMANENT MAGNET

(71) Applicant: TDK CORPORATION, Tokyo (JP)

(72) Inventors: Kenichi Suzuki, Tokyo (JP);
Kyung-Ku Choi, Tokyo (JP); Ryuji Hashimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/385,838

(22) PCT Filed: Jan. 17, 2014

(86) PCT No.: PCT/JP2014/050738
§ 371 (c)(1),
(2) Date: Sep. 17, 2014

(87) PCT Pub. No.: WO2014/148076
PCT Pub. Date: Sep. 25, 2014

(65) Prior Publication Data
US 2015/0248953 A1 Sep. 3, 2015

(30) Foreign Application Priority Data
Mar. 22, 2013 (JP) .................................. 2013-059678

(51) Int. Cl.
*H01F 1/057* (2006.01)
*H02K 1/02* (2006.01)
*H02K 21/12* (2006.01)

(52) U.S. Cl.
CPC ........... *H01F 1/057* (2013.01); *H01F 1/0577* (2013.01); *H02K 1/02* (2013.01); *H02K 21/12* (2013.01)

(58) Field of Classification Search
None
See application file for complete search history.

(56) References Cited

U.S. PATENT DOCUMENTS

| | | |
|---|---|---|
| 4,765,848 A | 8/1988 | Mohri et al. |
| 4,836,868 A | 6/1989 | Yajima et al. |

(Continued)

FOREIGN PATENT DOCUMENTS

| | | |
|---|---|---|
| CN | 102360655 A | 2/2012 |
| JP | A-59-46008 | 3/1984 |

(Continued)

OTHER PUBLICATIONS

Liu et al. (Journal of Alloys and Compounds, 2013, vol. 549, p. 366-369). Available online Oct. 23, 2012.*

(Continued)

*Primary Examiner* — Xiaowei Su
(74) *Attorney, Agent, or Firm* — Oliff PLC

(57) ABSTRACT

A R-T-B based permanent magnet which has equivalent magnetic properties as the existing Nd—Fe—B based permanent magnet and light mass but also can be suitably used as a magnet for field system of a permanent magnet synchronous rotating machine. The magnet can be obtained in a case where the composition of the compound for forming the main phase is $(R_{1-x}(Y_{1-z}Ce_z)_x)_2T_{14}B$ (R is rare earth element(s) consisting of one or more elements selected from La, Pr, Nd, Sm, Eu, Gd, Tb, Dy, Ho, Er, Tm, Yb and Lu, Y is yttrium, Ce is cerium, T is one or more transition metal elements with Fe or Fe and Co as essential element(s), B is boron, $0.0 < x \leq 0.5$ and $0.0 \leq z \leq 0.5$), by making the abundance ratio of $Y_{4f}/(Y_{4f}+Y_{4g})$ in relation to the Y occupying the 4f site of the tetragonal $R_2T_{14}B$ structure (i.e., $Y_{4f}$) and the Y occupying the 4g site (i.e., $Y_{4g}$) satisfies $0.8 \leq Y_{4f}/(Y_{4f}+Y_{4g}) \leq 1.0$.

4 Claims, 2 Drawing Sheets

(a) HAADF image (b) crystal structure model

(56) References Cited

U.S. PATENT DOCUMENTS

| | | | | |
|---|---|---|---|---|
| 6,120,620 | A | * | 9/2000 | Benz .................. C22C 1/0441 148/101 |
| 7,048,808 | B2 | | 5/2006 | Kaneko et al. |
| 2005/0268993 | A1 | * | 12/2005 | McCallum ............. H01F 1/057 148/302 |
| 2015/0132178 | A1 | | 5/2015 | Suzuki et al. |
| 2015/0248953 | A1 | | 9/2015 | Suzuki et al. |
| 2015/0279526 | A1 | | 10/2015 | Enokido et al. |
| 2015/0279527 | A1 | | 10/2015 | Suzuki et al. |
| 2015/0279528 | A1 | | 10/2015 | Suzuki |

FOREIGN PATENT DOCUMENTS

| | | |
|---|---|---|
| JP | A-61-081606 | 4/1986 |
| JP | A-62-122106 | 6/1987 |
| JP | A-62-202506 | 9/1987 |
| JP | A-62-281403 | 12/1987 |
| JP | A-10-163014 | 6/1998 |
| JP | A-2002-190404 | 7/2002 |
| JP | A-2011-187624 | 9/2011 |

OTHER PUBLICATIONS

Written Opinion of the International Searching Authority issued in International Application No. PCT/JP2014/050738 dated Apr. 22, 2014 (with partial translation).
International Search Report issued in International Application No. PCT/JP2014/050738 dated Apr. 22, 2014 (with translation).
Mar. 28, 2017 Office Action issued in U.S. Appl. No. 14/385,855.
Written Opinion of the International Searching Authority issued in International Application No. PCT/JP2014/053111 dated Apr. 22, 2014 (with partial translation).
International Search Report issued in International Application No. PCT/JP2014/053111 dated Apr. 22, 2014 (with translation).
Sep. 20, 2016 Office Action issued in U.S. Appl. No. 14/385,855.
U.S. Appl. No. 14/385,855, filed Sep. 17, 2014 in the name of Kenichi Suzuki et al.
Aug. 25, 2017 Office Action Issued in U.S. Appl. No. 14/385,855.

\* cited by examiner (a) HAADF image    (b) crystal structure model

R-T-B BASED PERMANENT MAGNET

The present invention relates to a R-T-B based permanent magnet, and particularly to a light permanent magnet obtained by selectively replacing part of R in the R-T-B based permanent magnet with Y and Ce.

BACKGROUND

The R-T-B based permanent magnet (R is rare earth element(s), T is Fe or Fe with part of which is replaced with Co, and B is boron) having the tetragonal compound $R_2T_{14}B$ as the main phase is known to have excellent magnetic properties and has been a representative permanent magnet with high performance since the invention in 1982 (Patent document 1: JPS59-46008A).

The R-T-B based magnets with the rare earth element(s) R being consisted of Nd, Pr, Dy, Ho and Tb have a large anisotropy magnetic field Ha and are preferably used as permanent magnet materials. Among them, the Nd—Fe—B based magnet having Nd as the rare earth element(s) R is widely used because it has a good balance among saturation magnetization Is, Curie temperature Tc and anisotropy magnetic field Ha, and is superior in resource abundance and corrosion resistance than R-T-B based magnets using other rare earth elements as R.

As a rotating machine widely used in consumer, industry, transportation equipment, permanent-magnet synchronous rotating machines tend to be used extensively in terms of saving energy and energy density in recent years.

For a permanent-magnet synchronous motor, it is provided with permanent magnets in the rotor. If permanent magnets with rare earth element Nd (which has a large specific gravity) occupying about ⅓ of their masses like Nd—Fe—B based magnets are used, a problem will exist that the moment of inertia will increase because of the increasing of rotor weight. That means it will cause a reduction in controllability and efficiency.

PATENT DOCUMENTS

Patent document 1: JPS59-46008A
Patent document 2: JP2011-187624A

Among R for consisting the R-T-B based magnet, Y is known as an element lighter than Nd. In Patent document 2, a Y-T-B based magnet with the rare earth element R in the R-T-B based magnet being Y has been disclosed. A magnet with a practical coercive force can be obtained by making the amounts of Y and B larger than the stoichiometric composition of $Y_2Fe_{14}B$ even if the $Y_2Fe_{14}B$ phase having a small anisotropy magnetic field Ha is the main phase. However, with a Br being about 0.5 to 0.6 T, and a $H_{cJ}$ being about 250 to 350 kA/m, the magnetic properties of the Y-T-B based magnet disclosed in Patent document 2 are much lower than those of the Nd—Fe—B based magnet. Thus, it is difficult to use the magnet of Patent document 2 to replace the Nd—Fe—B based magnet as a light permanent magnet for use in the permanent-magnet synchronous motor.

SUMMARY

The present invention is made on the recognition of such situation and is aimed to provide a light permanent magnet which will not significantly reduce the magnetic properties as compared with the Nd—Fe—B based magnet widely used in consumer, industry, transportation equipment and etc.

The R-T-B based permanent magnet of this invention is characterized in containing main phase grains with the composition being $(R_{1-x}(Y_{1-z}Ce_z)_x)_2T_{14}B$ (R is rare earth element(s) consisting of one or more elements selected from La, Pr, Nd, Sm, Eu, Gd, Tb, Dy, Ho, Er, Tm, Yb and Lu, T is one or more transition metal elements with Fe or Fe and Co as essential element(s), $0.0<x\leq0.5$ and $0.0\leq z\leq0.5$), wherein the abundance ratio of $Y_{4f}/(Y_{4f}+Y_{4g})$ satisfies $0.8\leq Y_{4f}/(Y_{4f}+Y_{4g})\leq 1.0$ when the Y occupying the 4f site of the tetragonal $R_2T_{14}B$ structure in the main phase grains is denoted as $Y_{4f}$ and the Y occupying the 4g site is denoted as $Y_{4g}$.

The inventors of the present invent found that, in the R-T-B based permanent magnet, a light permanent magnet in which the magnetic properties are not reduced in comparison with the existing Nd—Fe—B based permanent magnet can be obtained by making the arrangement of the rare earth elements R occupying specific sites of a crystal lattice to be a suitable arrangement, especially by selectively replacing Nd which exists in the 4f site of the $Nd_2Fe_{14}B$ crystal structure in the Nd—Fe—B based permanent magnet with Y and Ce.

Magneto crystalline anisotropy, as the origin of the coercive force of rare earth based magnets, is generated by the single-ion anisotropy of rare earth ions constraining the entire magnetic moment of the crystal. The single-ion anisotropy of the rare earth ions is determined by the arrangement of atoms and the electron cloud of the ions. For example, in the tetragonal $Nd_2Fe_{14}B$ structure, there are two sites for Nd ions, i.e. 4f site and 4g site. The ion anisotropy of Nd occupying the 4g site is parallel to the entire magnetic anisotropy of the crystal, and thus can contribute to the increase of the magneto crystalline anisotropy. However, the ion anisotropy of Nd occupying the 4f site is orthogonal to the entire magnetic anisotropy of the crystal, and thus renders a loss in magneto crystalline anisotropy.

The single-ion anisotropy of Nd that occupies the 4f site and causes a loss in magneto crystalline anisotropy is derived from the pancake-type electron cloud of Nd. If only Nd in such 4f site can be replaced by atoms with spherical electron cloud that does not exhibit anisotropy and the loss in magneto crystalline anisotropy can be reduced, a permanent magnet exhibiting magneto crystalline anisotropy higher than $Nd_2Fe_{14}B$ can be obtained.

Among the atoms that can replace at the 4f site of the tetragonal $Nd_2Fe_{14}B$ structure, elements with a spherical electron cloud include Y and La. However, the ionic radius of La is large, and it can hardly replace the 4f site which is less distanced from adjacent atoms as compared with 4g site. That is, if Y is selected as the element for selectively replacing 4f site, a permanent magnet exhibiting higher magneto crystalline anisotropy than the existing $Nd_2Fe_{14}B$ can be obtained through a relatively simple manufacturing process. In addition, the atomic weight of Y is 88.91, which is lower than the atomic weight of Nd, 144.2, and thus a permanent magnet obtained by replacing Nd with Y is lighter than the existing Nd—Fe—B based permanent magnet.

In order to selectively perform replacement with Y at 4f site of the tetragonal $Nd_2Fe_{14}B$ structure, it is necessary to adjust the interatomic distance so that the Y which has taken the replacement is stabilized at 4f site. Ce exhibits a fluctuation in the valence number and a variation in the corresponding ionic radius, and thus it is a suitable additive element for selectively and stably performing replacement with Y at 4f site of the tetragonal $Nd_2Fe_{14}B$ structure.

According to the present invention, light permanent magnets for which the magnetic properties are not significantly reduced in comparison with the existing Nd—Fe—B based magnet can be obtained by selectively replacing part of R in the R-T-B based permanent magnet with Y and Ce, and the magnets are suitable for use in permanent magnet synchronous rotating machines.

DETAILED DESCRIPTION OF EMBODIMENTS

Figure 1:
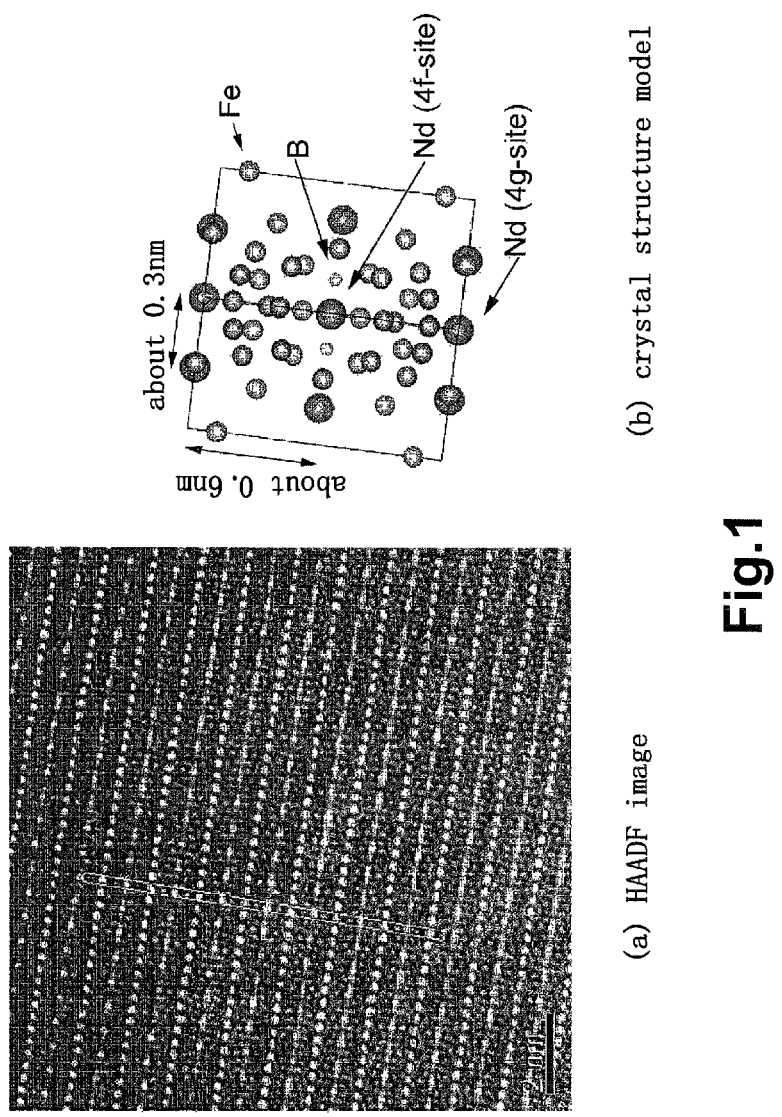
FIG. 1(a) is the HAADF image of the main phase grains of the sintered body in the comparative example 1 of the present invention as observed in direction [110].
FIG. 1(b) is the crystal structure model of the $Nd_2Fe_{14}B$ crystal structure as observed in direction [110].

Hereinafter, the preferred embodiments of the present invention are specifically described. In addition, the embodiments do not limit the invention but are only examples, and all the features and the combinations thereof recited in the embodiments are not necessarily limited to the substantive contents of the invention.

The R-T-B based permanent magnet of this invention is characterized in containing main phase grains with the composition being $(R_{1-x}(Y_{1-z}Ce_z)_x)_2T_{14}B$ (R is rare earth element(s) consisting of one or more elements selected from La, Pr, Nd, Sm, Eu, Gd, Tb, Dy, Ho, Er, Tm, Yb and Lu, T is one or more transition metal elements with Fe or Fe and Co as essential elements, $0.0<x\leq0.5$ and $0.0\leq z\leq0.5$), wherein the abundance ratio of $Y_{4f}/(Y_{4f}+Y_{4g})$ satisfies $0.8\leq Y_{4f}/(Y_{4f}+Y_{4g})\leq 1.0$ when the Y occupying the 4f site of the tetragonal $R_2T_{14}B$ structure in the above main phase grains is denoted as $Y_{4f}$ and the Y occupying the 4g site is denoted as $Y_{4g}$.

In the present embodiments, R is rare earth element(s) consisting of one or more elements selected from La, Pr, Nd, Sm, Eu, Gd, Tb, Dy, Ho, Er, Tm, Yb and Lu.

In the present embodiments, the sum amount x occupied by Y and Ce in the composition of the main phase grains satisfies $0.0<x\leq 0.5$. With x increasing, density decrease is caused by replacement of Nd (which is higher in atomic weight) by Y (which is lower in atomic weight), i.e., the effect of lightening the magnet is increased. However, if x exceeds 0.5, the magnetic properties of the resulting sample are significantly reduced.

In the present embodiments, the relative amount z between Y and Ce satisfies $0.0\leq z\leq 0.5$. Y has the lowest atomic weight in the selected elements as R of the tetragonal $R_2T_{14}B$ structure, and the replacement only by Y (z=0.0) is effective if only from the viewpoint of lightening the magnet. However, if 4f site of the tetragonal $Nd_2Fe_{14}B$ structure is selectively replaced with Y, it is necessary to suitably adjust the size (the distance between adjacent atoms) of the 4f site and the 4g site in order to make the replaced Y stable at the 4f site. Thus it is preferable to use a suitable amount ($0.0\leq z\leq 0.5$) of Ce which exhibits a fluctuation in the valence number and a variation in the corresponding ionic radius, together with Y, to perform the replacement to be R.

In the present embodiments, B may have a part thereof replaced by C. Preferably, the replacing amount of C is 10 at. % or less relative to B.

In the present embodiments, T, which forms the balance, is one or more transition metal elements with Fe or Fe and Co as essential element(s). Preferably, the amount of Co is 0 at. % or more and 10 at. % or less relative to the amount of T. By addition of the Co amount, the Curie temperature can be increased and the decrease of coercive force corresponding to the increase of the temperature can be inhibited to be low. In addition, by addition of the Co amount, the corrosion resistance of the rare earth based permanent magnet can be increased.

Hereinafter, the preferred examples of the manufacturing method of the present invention are described.

In the manufacture of the R-T-B based permanent magnet of the present embodiment, alloy raw materials for obtaining the R-T-B based magnet with the desired composition are firstly prepared. The alloy raw materials can be made by a strip casting method or by other known melting methods in vacuum or in inert gas preferably Ar atmosphere. The strip casting method sprays the molten metal obtained by melting the metal raw materials in non-oxidizing atmosphere such as Ar atmosphere and the like to the surface of the rotating roller. The quenched molten metal on the roller is quenched and solidified into a thin plate or a thin sheet (squama) shape. Said quenched and solidified alloy has a homogeneous composition with the crystal particle diameter being 1~50 µm. The alloy raw materials can be obtained, not limited to the strip casting method, but also by melting methods such as high frequency induction melting and the like. In addition, in order to prevent segregation after melting, they may be poured to for example water-cooled copper plates so as to be solidified. Further, alloys obtained by a reduction diffusion method may also be used as the raw material alloys.

In the case of obtaining the R-T-B based permanent magnet in the present invention, for the alloy raw materials, substantially, the so-called single-alloy method for manufacturing a magnet from alloy of one kind of metal may suitably be used, but the so-called mixing method may also be suitably used, which uses a main phase alloy and a alloy contributing to effective formation of the grain boundary. The main phase alloy (low-R alloy) has the main phase grains (i.e., $R_2T_{14}B$ crystals) as the main part while the alloy contributing to effective formation of the grain boundary (high-R alloy) contains more R than the low-R alloy.

The alloy raw materials are supplied to a pulverization step. In a case where the mixing method is used, the low-R alloy and the high-R alloy are pulverized separately or pulverized together. The pulverization step includes a coarse pulverization step and a fine pulverization step. Firstly, the alloy raw materials are coarsely pulverized until the particle diameter is approximately several hundreds of micrometers. The coarse pulverization is preferably performed using a stamp mill, a jaw crusher, a Brown mill and the like under inert gas atmosphere. Before coarse pulverization, it is more effective to perform pulverizing by allowing the raw material alloy adsorbed with hydrogen and then released the hydrogen. The hydrogen-releasing treatment is performed aiming to reduce hydrogen that forms into the impurities of the rare earth based sintered magnet. The maintained heating temperature for hydrogen adsorption is 200° C. or more, preferably 350° C. or more. The maintaining time varies depending on the relationship with maintained temperature, the thickness of the alloy raw material and etc., but it is at least 30 min or more, preferably 1 hour or more. The hydrogen-releasing treatment is preformed in vacuum or in a Ar gas flow. Further, the hydrogen-adsorbing treatment and the hydrogen-releasing treatment are not necessary treatments. The hydrogen pulverization can also be the coarse pulverization to omit a mechanical coarse pulverization.

After the coarse pulverization process, the resultant is transferred to the fine pulverization process. During the fine pulverization, a jet mill is mainly used to pulverize the coarsely pulverized powder having a particle diameter of approximately several hundreds of micrometers to an average particle diameter of 2.5~6 μm, preferably 3~5 μm. The jet mill adopts, for performing pulverization, a method of discharging high-pressure inert gas from a narrow nozzle to produce a high-speed gas flow, via which the coarsely pulverized powder is accelerated, thereby causing collision between the coarsely pulverized powders or collision with a target or a container wall.

The wet pulverization can also be used in the fine pulverization. In the wet pulverization, a ball mill, or a wet attritor, or the like is used to pulverize the coarsely pulverized powder having a particle diameter of approximately several hundreds of micrometers to an average particle diameter of 1.5~5 μm, preferably 2~4.5 ~m. By selecting a suitable dispersion medium in the wet pulverization, the powder of magnet can be pulverized without contacting oxygen, and thus fine powder with a low concentration of oxygen can be obtained.

During the fine pulverization, a fatty acid or a fatty acid derivative or a hydrocarbon, for example, stearic acids or oleic acids such as zinc stearate, calcium stearate, aluminum stearate, stearic amide, oleic amide, ethylene bis-isostearic amide; hydrocarbons such as paraffin, naphthalene and the like, can be added at about 0.01~0.3 wt % for the purpose of improving the lubrication and orientation properties in molding.

The finely pulverized powder is supplied to the molding process in a magnetic field. The molding pressure when molding in the magnetic field may be in a range of 0.3~3 ton/cm² (30~300 MPa). The molding pressure may be constant from the beginning of the molding to the end, and may also be increased or decreased gradually, or it may be irregularly varied. The lower the molding pressure, the better the orientation property. However, if the molding pressure is too low, problems will occur during handling due to insufficient strength of the molded article, thus the molding pressure is selected from the above range in this consideration. The final relative density of the molded article obtained by molding in the magnetic field is usually 40~60%.

The magnetic field is applied at about 960~1600 kA/m (10~20 kOe). The applied magnetic field is not limited to a static magnetic field, and it may also be a pulsed magnetic field. In addition, a static magnetic field and a pulsed magnetic field may be used together.

Subsequently, the molded article is provided to the sintering process. Sintering is conducted in vacuum or under inert gas atmosphere. The sintering maintaining temperature and the sintering maintaining time need to be adjusted according to conditions such as the composition, the pulverization method, the difference in average particle diameter and in grain size distribution and the like, and the sintering may simply be maintained at about 1000~1200° C. for 2 hours to 20 hours. The resultant is transferred to a temperature lowering process after a suitable maintaining period. And the temperature lowering rate may be $10^{-4\circ}$ C./sec~$10^{-2\circ}$ C./sec. At this time, the temperature lowering rate does not need to be always constant from the maintaining temperature until the room temperature, as long as it is controlled within the above range in a specified temperature zone. The temperature of the zone for which the temperature lowering rate is to be controlled is determined by the composition, and is about 400° C. to 1000° C. The inventors believe that various elements contained in the composition may be in a configuration with the most stable structure by controlling the temperature lowering rate in the specified temperature zone determined by the composition and thereby the characteristic structure of this invention is formed. That is, making the temperature lowering rate sufficiently low is a necessity for realizing the invention, and the temperature lowering rate needs at least to be lower than $10^{-2\circ}$ C./sec. However, a temperature lowering rate lower than $10^{-4}$ ° C./sec will lead to a significant decrease in the manufacturing efficiency, and thus is not realistic.

After sintering, the obtained sintered body may be subjected to an aging treatment. The aging treatment process is a process effective in increasing the coercive force. However, when the aging treatment is conducted at a temperature in the vicinity of the above temperature zone for which the temperature lowering rate needs to be controlled, it is effective to control the cooling rate from the aging temperature also within the above range of the temperature lowering rate.

Hereinabove, the embodiments for best implementing the manufacturing methods of the present invention are described. Next, regarding the R-T-B based permanent magnet of the present invention, descriptions are provided in terms of the methods for analyzing the composition of the main phase grains and the occupying positions of the rare earth elements in the $R_2T_{14}B$ crystal structure.

In the present invention, the composition of the R-T-B based permanent magnet may be determined by energy dispersive X-ray analysis. The sintered body which is the sample is cut off in a direction perpendicular to the axis of easy magnetization (i.e., the direction in which the magnetic filed is applied when performing molding), and after it is determined that the main generation phase belongs to the tetragonal $R_2T_{14}B$ structure via X ray diffraction, the sintered body is processed to be a thin sheet shape with a thickness of 100 nm in a Focused Ion Beam (FIB) device. The vicinity of the center of the main phase grains is analyzed in the Energy Dispersive X-ray Spectroscopy (EDS) equipped on the Scanning Transmission Electron Microscope (STEM), and the composition of the main phase grains can be quantified by using the film correcting function.

The EDS device can hardly quantify B due to the low sensitivity to light elements. In this regard, the composition of the main phase grains is determined by the composition ratio of elements other than B based on the condition that the main generation phase is determined to be tetragonal $R_2T_{14}B$ structure via X ray diffraction in advance.

The composition of the main phase grains quantified by the above method may be controlled by adjusting the entire composition of the sintered body sample. The results obtained by comparing the composition of the entire sintered body sample obtained by Inductively Coupled High Frequency Plasma Spectrometry Analysis (ICP Spectrometry Analysis: Inductively Coupled Plasma Spectrometry) with the composition of the main phase grains obtained by the EDS device shows a tendency of a higher rare earth elements in the entire composition of the sintered body sample. This is because the sintered body sample needs to contain more rare earth based elements than the stoichiometric composition of $R_2T_{14}B$ in order to cause densification and formation of the grain boundary by sintering. However, regarding the ratio of the rare earth elements contained as R, the composition of the entire sintered body sample is substantially the same as that of the main phase grains. That is, by adjusting the composition of the entire sintered body sample, the ratio of the rare earth elements contained as R in the main phase grains $R_2T_{14}B$ may be controlled.

When the Y occupying the 4f site of the tetragonal $R_2T_{14}B$ structure is denoted as $Y_{4f}$ and the Y occupying the 4g site is denoted as $Y_{4g}$, the abundance ratio of $Y_{4f}/(Y_{4f}+Y_{4g})$ satisfies $0.8 \le Y_{4f}/(Y_{4f}+Y_{4g}) \le 1.0$. The present invention is characterized in that, a permanent magnet exhibiting higher uniaxial anisotropy than $Nd_2Fe_{14}B$ by only replacing the Nd occupying the 4f site with Y, wherein the Nd occupying the 4f site will cause a loss in the uniaxial anisotropy of the entire crystal due to the ion anisotropy in a direction perpendicular to the anisotropy of $Nd_2Fe_{14}B$, while Y has a spherical electron cloud that does not exhibit anisotropy. Due to the equivalent amounts of 4f site and 4g site in the $Nd_2Fe_{14}B$ crystal, $Y_{4f}/(Y_{4f}+Y_{4g})=1.0$ if all the 4f site is replaced by Y, forming an optimal embodiment of the present invention. However, it is not necessary to replace all the 4f site with Y in reality, and a magnet exhibiting sufficiently applicable magnetic properties can be obtained in the range $0.8 \le Y_{4f}/(Y_{4f}+Y_{4g}) \le 1.0$.

The abundance ratio of $Y_{4f}/(Y_{4f}+Y_{4g})$ in relation to the Y occupying the 4f site of the above tetragonal $R_2T_{14}B$ structure (i.e., $Y_{4f}$) and the Y occupying the 4g site (i.e., $Y_{4g}$) may be determined by the High-Angle Annular Dark-Field (HAADF) image obtained by scanning transmission electron microscopy.

After the sintered body is cut off in a direction perpendicular to the axis of easy magnetization in which the magnetic field is applied when performing molding and the sintered body is processed to be a thin sheet shape with a thickness of 100 nm by a focused ion beam (FIB) device, the sample is adjusted to a position in a scanning transmission electron microscope (STEM) where the $Nd_2Fe_{14}B$-type crystal structure can be observed in the [110] direction, to obtain an HAADF image. FIG. 1 exemplifies the (a) HAADF image and the (b) crystal structure model as observed in direction [110] obtained from the sintered body of which the composition of the main phase grains is $Nd_2Fe_{14}B$.

Figure 2:
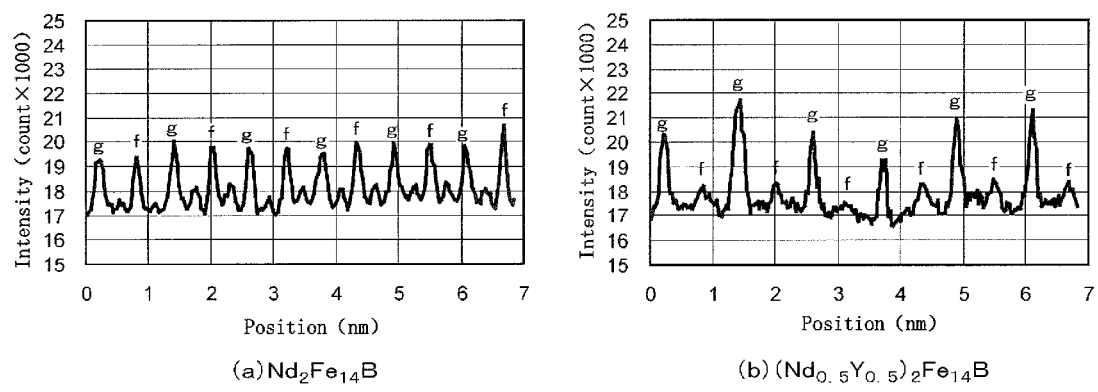
FIG. 2(a) is the line profile of intensity of the HAADF image of the main phase grains having the composition of $Nd_2Fe_{14}B$ (comparative example 1) as observed in direction [110].
FIG. 2(b) is the line profile of intensity of the HAADF image of the main phase grains having the composition of $(Nd_{0.5}Y_{0.5})_2Fe_{14}B$ (example 3) as observed in direction [110].

In the above HAADF image, the intensity is roughly proportional to the square of the atomic number, and thus B (atomic number: 5), Fe (atomic number: 26), Y (atomic number: 39) and rare earth elements except Y (atomic number: larger than 57) can be distinguished easily. Particularly, 4f site and 4g site can be separated clearly without overlapping when the $Nd_2Fe_{14}B$ type crystal structure is observed in direction [110]. The line profiles of the intensity obtained from the HAADF images of the sintered bodies having a composition of (a) $Nd_2Fe_{14}B$ and (b) $(Y_{0.5}Nd_{0.5})_2Fe_{14}B$ are shown in FIG. 2. In addition, the line profiles are obtained along the rectangular region shown in the HAADF image of FIG. 1(a).

In the HAADF image of the $Nd_2Fe_{14}B$ crystal as observed in direction [110] shown in FIG. 2(a), both the intensity of 4f site and 4g site are high and they have equivalent intensity, and thus it can be determined that both the 4f site and 4g site are occupied by Nd which have a large atomic number.

In the HAADF image of the $(Y_{0.5}Nd_{0.5})_2Fe_{14}B$ crystal as observed in direction [110] shown in FIG. 2(b), the intensity in the position of 4f site is low while that in the position of 4g site is high. That is, it can be determined that Y having a lower atomic number occupies the 4f site while Nd having a larger atomic number occupies the 4g site.

EXAMPLES

Hereinafter, the contents of the present invention are further specifically described based on the examples and comparative examples, but the present invention are not completely limited to the following examples.

Specified amounts of Nd metal, Y metal, Ce metal, electrolytic iron and ferroboron were weighted to make the composition of the main phase grains to be $(Nd_{1-x}(Y_{1-z}Ce_z)_x)_2Fe_{14}B$ (x=0.0~0.7, z=0.0~1.0), and a thin-plate shape R-T-B alloy were manufactured via a strip casting method. After subjecting said alloy to stirring in a hydrogen gas flow with a simultaneous heating treatment to prepare coarse powder, an oleic amide was added as a lubricant, and fine powder was prepared in a no-oxidizing atmosphere with a jet mill (the average particle diameter being 3 μm). The resultant fine powder was filled into a mold (with an opening size of 20 mm×18 mm) and subjected to uniaxial pressing molding with a pressure of 2.0 ton/cm² under a magnetic field (2T) applied in a direction perpendicular to the pressing direction. After the resultant molded article was heated to the optimal sintering temperature and maintained for 4 hours, the resultant was cooled to room temperature to obtain the sintered body, wherein the temperature decreasing rate in a temperature zone of ±50° C. centered at 400° C. to 800° C. was made to be $10^{0o}$ C./sec~$10^{-2o}$ C./sec, and the temperature decreasing rate in a temperature zone other than the above was $10^{-1o}$ C./sec. The results obtained by determining the magnetic properties of the sintered body using a B—H tracer and the results obtained by determining the density of the sintered body were shown in Table 1.

The sintered body was cut off in a direction perpendicular to the axis of easy magnetization (i.e., the direction in which the magnetic filed was applied when performing molding), and it was determined that the main generation phase belonged to the tetragonal $R_2T_{14}B$ structure via X ray diffraction method. Subsequently, after the sintered body was processed to be a thin sheet shape with a thickness of 100 nm by an FIB device, the vicinity of the center of the main phase grains was analyzed with the EDS device equipped to the STEM, and the composition of the main phase grains was quantified by using the film correcting function. Next, the sample was adjusted to a position where the tetragonal $R_2T_{14}B$ structure can be observed from the direction [110], to obtain an HAADF image. Targeting at the square area in the HAADF image, of which the length of each side was 10 nm, the abundance ratio of $Y_{4f}/(Y_{4f}+Y_{4g})$ in relation to the $Y_{4f}$ occupying the 4f site of the tetragonal $R_2T_{14}B$ structure and the $Y_{4g}$ occupying the 4g site, which was obtained by counting the numbers of Y in the 4f site and 4g site based on the intensity information, were shown in Table 1.

Examples 1~3 and Comparative Examples 1~3

In a composition in which the R in the tetragonal $R_2T_{14}B$ structure was Nd and it was replaced with only Y (x=0.0~0.7, z=0.0), the density decreases as the replacement amount x of Y relative to Nd increases and the effects of density decreasing and lightening were obtained. However, when x≥0.6, the residual magnetic flux density $B_r$ and the coercive force $H_{cJ}$ decreased significantly. That was, it could be known that in a case where Nd was replaced with only Y (z=0.0), within the range $0.0 < x \le 0.5$, an excellent permanent magnet could be obtained, which not only had a practical residual magnetic flux density $B_r$ and coercive force $H_{cJ}$, but also was lighter than the existing Nd—Fe—B based magnet, and which exhibited a higher responsiveness and controllability when applied in a permanent magnet synchronous rotating machine. In addition, it could be known that within the above range, the abundance ratio of $Y_{4f}/(Y_{4f}+Y_{4g})$ in relation to the $Y_{4f}$ occupying the 4f site and the $Y_{4g}$ occupying the 4g site was 0.89~0.96, and most Y that replaced Nd selectively occupied the 4f site.

Comparative Examples 8~12

In a composition in which the R in the tetragonal $R_2T_{14}B$ structure was Nd and it was replaced with only Ce (x=0.2~0.7, z=1.0), the residual magnetic flux density $B_r$ and the coercive force $H_{cJ}$ decreased monotonically with the replacement amount x of Ce relative to Nd increased. In addition, a decrease in the density accompanied with the increase of the replacement amount x of Ce was not observed. That was, it could be known that in a case where Nd was replaced with only Ce (z=1.0), the resultant permanent magnet did not have a practical residual magnetic flux density $B_r$ and coercive force $H_{cJ}$, and a permanent magnet lighter than the existing Nd—Fe—B based magnet could not be obtained.

Examples 4~6 and Comparative Examples 4~5

In a composition in which the R in the tetragonal $R_2T_{14}B$ structure was Nd and replacement was performed with Y and Ce in half and half (x=0.2~0.7, z=0.5), the density decreased as the replacement amount x of Y and Ce relative to Nd increased, obtaining a density decreasing and lightening effect caused by replacement of Nd by Y and Ce. In addition, as the replacement amount x of Y and Ce relative to Nd increased, the residual magnetic flux density $B_r$ and the coercive force $H_{cJ}$ decreased gradually, particularly, the coercive force $H_{cJ}$ decreased dramatically when x≥0.6. That was, it could be known that in a composition in which Nd was replaced with Y and Ce in half and half (z=0.5), within the range 0.0<x≤0.5, an excellent permanent magnet which had not only equivalent magnetic properties as the existing Nd—Fe—B based magnet and lighter mass but also exhibited a high responsiveness and controllability when used in a permanent magnet synchronous rotating machine could also be obtained. Further, it could be known that within the above range, the abundance ratio of $Y_{4f}/(Y_{4f}+Y_{4g})$ in relation to the $Y_{4f}$ occupying the 4f site and the $Y_{4g}$ occupying the 4g site was 0.87~0.95, and most Y that replaces Nd selectively occupied the 4f site.

Example 3, Examples 6~8, Comparative Examples 6~7 and Comparative Example 10

In a composition in which the R in the tetragonal $R_2T_{14}B$ structure was Nd and half of Nd was replaced with Y or Ce or both (x=0.5, z=0.0~1.0), the density increases as the relative amount z of Ce relative to Y increases, and it was equivalent to that of the existing Nd—Fe—B based magnet when z≥0.6. In addition, the residual magnetic flux density $B_r$ and the coercive force $H_{cJ}$ decreased significantly when the relative amount of Ce relative to Y exceeded a half (z≥0.6). That was, it could be known that within the range 0.0≤z≤0.5, an excellent permanent magnet which not only had equivalent magnetic properties as the existing Nd—Fe—B based magnet and lighter mass but also exhibited a high responsiveness and controllability when used in a permanent magnet synchronous rotating machine could be obtained. Moreover, it could be known that within the above range, the abundance ratio of $Y_{4f}/(Y_{4f}+Y_{4g})$ in relation to the $Y_{4f}$ occupying the 4f site and the $Y_{4g}$ occupying the 4g site was 0.87~0.89, and most Y that replaced Nd selectively occupied the 4f site.

Example 3, Examples 11~12 and Comparative Examples 13~17

In a composition in which the R in the tetragonal $R_2T_{14}B$ structure was Nd and half of Nd was replaced with only Y (x=0.5, z=0.0), the temperature decreasing rate in the temperature zone of 750° C.~850° C. (800±50° C.) was varied between $1 \times 10^{0}$° C./sec and $5 \times 10^{-5}$° C./sec. In a case where the temperature decreasing rate was $1 \times 10^{-4}$° C./sec~$1 \times 10^{-2}$° C./sec, magnetic properties were obtained which were equivalently excellent to that of the Nd—Fe—B based magnet with no replacement of Nd (comparative example 1). However, in a case where the temperature decreasing rate was larger than $10^{-2}$° C./sec, the magnetic properties decreased dramatically, and the abundance ratio of $Y_{4f}/(Y_{4f}+Y_{4g})$ in relation to the $Y_{4f}$ occupying the 4f site of the tetragonal $R_2T_{14}B$ structure and the $Y_{4g}$ occupying the 4g site also decreased. The inventors of the present invention believed that the dramatic decrease in magnetic properties accompanying the increase of the temperature decreasing rate was caused by the insufficient time for movement of the rare earth elements towards stable sites. In addition, in a case the temperature decreasing rate was lower than $1 \times 10^{-4}$° C./sec, although the magnetic properties decreased slightly, the abundance ratio of $Y_{4f}/(Y_{4f}+Y_{4g})$ in relation to the $Y_{4f}$ occupying the 4f site of the tetragonal $R_2T_{14}B$ structure and the $Y_{4g}$ occupying the 4g site was substantially maintained. The present inventors believed that the decrease in magnetic properties accompanying the decrease of the temperature decreasing rate was not caused by the Y occupancy in 4f site, but by the disappearance of the grain boundary structure due to extremely low temperature decreasing rate, wherein, the grain boundary structure was needed for the $R_2T_{14}B$ type permanent magnet to exhibit the coercive force.

Example 3 and Comparative Examples 18~22

In a composition in which the R in the tetragonal $R_2T_{14}B$ structure was Nd and half of Nd was replaced with only Y (x=0.5, z=0.0), the temperature zone with a temperature decreasing rate of $1 \times 10^{-2}$° C./sec was made to be varied between 450° C.~1050° C. (500±50° C.~1000±50° C.). In a case where the temperature zone with a temperature decreasing rate of $1 \times 10^{-2}$° C./sec was at 750° C.~850° C. (800±50° C.), magnetic properties were obtained which were equivalently excellent to that of the Nd—Fe—B based magnet with no replacement of Nd (comparative example 1). However, in a case where the temperature zone with a temperature decreasing rate of $1 \times 10^{-2}$° C./sec was at a temperature lower than 750° C.~850° C. (800±50° C.), the magnetic properties decrease, and the abundance ratio of $Y_{4f}/(Y_{4f}+Y_{4g})$ in relation to the $Y_{4f}$ occupying the 4f site of the tetragonal $R_2T_{14}B$ structure and the $Y_{4g}$ occupying the 4g site also decreases. The inventors of the present invention believed that the decrease in magnetic properties accompanying the temperature lowering of the temperature zone, of which the temperature decreasing rate was controlled, was caused by the insufficient energy for movement of the rare earth elements towards stable sites. In addition, in a case the temperature zone with a temperature decreasing rate of $1\times10^{-2}$ °C./sec was at a higher temperature than 750° C.~850° C. (800±50° C.), the magnetic properties decreased, and the abundance ratio of $Y_{4f}/(Y_{4f}+Y_{4g})$ in relation to the $Y_{4f}$ occupying the 4f site of the tetragonal $R_2T_{14}B$ structure and the $Y_{4g}$ occupying the 4g site also decreased slightly. The present inventors believed that the decrease in magnetic properties accompanying the temperature elevating of the temperature zone, of which the temperature decreasing rate was controlled, was caused by excess energy, and thus the rare earth elements would move away from the adjacent sites.

Example 6 and Comparative Examples 23~26

In a composition in which the R in the tetragonal $R_2T_{14}B$ structure was Nd and half of Nd was replaced with Y and Ce in half and half (x=0.5, z=0.5), the temperature zone with a temperature decreasing rate of $1\times10^{-2}$ °C./sec was made to be varied between 350° C.~850° C. (400±50° C.~800±50° C.). In a case where the temperature zone with a temperature decreasing rate of $1\times10^{-2}$ °C./sec was at 550° C.~650° C. (600±50° C.), magnetic properties were obtained which were equivalently excellent to that of the Nd—Fe—B based magnet with no replacement of Nd (comparative example 1). However, in a case where the temperature zone with a temperature decreasing rate of $1\times10^{-2}$ °C./sec was at a temperature lower than 550° C.~650° C. (600±50° C.), the magnetic properties decreased, and the abundance ratio of $Y_{4f}/(Y_{4f}+Y_{4g})$ in relation to the $Y_{4f}$ occupying the 4f site of the tetragonal $R_2T_{14}B$ structure and the $Y_{4g}$ occupying the 4g site also decreased. In addition, in a case where the temperature zone with a temperature decreasing rate of $1\times10^{-2}$ °C./sec was at a temperature higher than 550° C.~650° C. (600±50° C.), likewise, the magnetic properties decreased and the abundance ratio of $Y_{4f}/(Y_{4f}+Y_{4g})$ in relation to the $Y_{4f}$ occupying the 4f site of the tetragonal $R_2T_{14}B$ structure and the $Y_{4g}$ occupying the 4g site also decreased. The inventors of the present invention believed that the difference between the optimal temperature zones, for which the temperature decreasing rate was controlled, in a composition with half of Nd replaced with only Y (example 3 and comparative examples 18~22) and in a composition with half of Nd replaced with Y and Ce (example 6 and comparative examples 23~26) was resulted from the different energies used for movement of the rare earth elements towards stable sites.

Example 3, and Examples 9~10

In a composition in which the R in the tetragonal $R_2T_{14}B$ structure was Nd, or R was Nd and Dy, or Nd and Tb, it could be known that, in all of the compositions in which half of R is replaced with only Y (x=0.5, z=0.0), an excellent permanent magnet which not only had the equivalent magnetic properties as the existing Nd—Fe—B based magnet and lighter mass but also exhibits a high responsiveness and controllability when used in a permanent magnet synchronous rotating machine could be obtained. In addition, it could be known that in the above compositions, the abundance ratio of $Y_{4f}/(Y_{4f}+Y_{4g})$ in relation to the $Y_{4f}$ occupying the 4f site and the $Y_{4g}$ occupying the 4g site was 0.88~0.89, and most Y that replaces R selectively occupied the 4f site.

TABLE 1

| | composition of the main phase grains | x | z | temperature decreasing rate °C./sec | temperature controlling zone ±50° C. | $B_r$ mT | $H_{cJ}$ kA/m | density g/cm³ | $Y_{4f}/(Y_{4f}+Y_{4g})$ |
|---|---|---|---|---|---|---|---|---|---|
| Ex. 1 | $(Nd_{0.8}Y_{0.2})_2Fe_{14}B$ | 0.2 | 0.0 | 1.0E-02 | 800 | 1217 | 1047 | 7.41 | 0.96 |
| Ex. 2 | $(Nd_{0.6}Y_{0.4})_2Fe_{14}B$ | 0.4 | 0.0 | 1.0E-02 | 800 | 1160 | 1075 | 7.29 | 0.94 |
| Ex. 3 | $(Nd_{0.5}Y_{0.5})_2Fe_{14}B$ | 0.5 | 0.0 | 1.0E-02 | 800 | 1158 | 1059 | 7.22 | 0.89 |
| Ex. 4 | $(Nd_{0.8}Y_{0.1}Ce_{0.1})_2Fe_{14}B$ | 0.2 | 0.5 | 1.0E-02 | 600 | 1171 | 966 | 7.46 | 0.95 |
| Ex. 5 | $(Nd_{0.6}Y_{0.2}Ce_{0.2})_2Fe_{14}B$ | 0.4 | 0.5 | 1.0E-02 | 600 | 1137 | 893 | 7.40 | 0.91 |
| Ex. 6 | $(Nd_{0.5}Y_{0.25}Ce_{0.25})_2Fe_{14}B$ | 0.5 | 0.5 | 1.0E-02 | 600 | 1096 | 952 | 7.38 | 0.87 |
| Ex. 7 | $(Nd_{0.5}Y_{0.4}Ce_{0.1})_2Fe_{14}B$ | 0.5 | 0.2 | 1.0E-02 | 600 | 1099 | 994 | 7.30 | 0.88 |
| Ex. 8 | $(Nd_{0.5}Y_{0.3}Ce_{0.2})_2Fe_{14}B$ | 0.5 | 0.4 | 1.0E-02 | 600 | 1093 | 944 | 7.35 | 0.87 |
| Ex. 9 | $(Nd_{0.49}Dy_{0.01}Y_{0.5})_2Fe_{14}B$ | 0.5 | 0.0 | 1.0E-02 | 800 | 1131 | 1305 | 7.24 | 0.89 |
| Ex. 10 | $(Nd_{0.49}Tb_{0.01}Y_{0.5})_2Fe_{14}B$ | 0.5 | 0.0 | 1.0E-02 | 800 | 1029 | 1540 | 7.25 | 0.88 |
| Ex. 11 | $(Nd_{0.5}Y_{0.5})_2Fe_{14}B$ | 0.5 | 0.0 | 1.0E-03 | 800 | 1148 | 1103 | 7.23 | 0.90 |
| Ex. 12 | $(Nd_{0.5}Y_{0.5})_2Fe_{14}B$ | 0.5 | 0.0 | 1.0E-04 | 800 | 1154 | 997 | 7.23 | 0.91 |
| Com. Ex. 1 | $Nd_2Fe_{14}B$ | 0.0 | 0.0 | 1.0E-02 | 800 | 1210 | 960 | 7.52 | — |
| Com. Ex. 2 | $(Nd_{0.4}Y_{0.6})_2Fe_{14}B$ | 0.6 | 0.0 | 1.0E-02 | 800 | 1096 | 889 | 7.16 | 0.81 |
| Com. Ex. 3 | $(Nd_{0.3}Y_{0.7})_2Fe_{14}B$ | 0.7 | 0.0 | 1.0E-02 | 800 | 978 | 782 | 7.10 | 0.68 |
| Com. Ex. 4 | $(Nd_{0.4}Y_{0.3}Ce_{0.3})_2Fe_{14}B$ | 0.6 | 0.5 | 1.0E-02 | 600 | 914 | 840 | 7.37 | 0.82 |
| Com. Ex. 5 | $(Nd_{0.3}Y_{0.35}Ce_{0.35})_2Fe_{14}B$ | 0.7 | 0.5 | 1.0E-02 | 600 | 800 | 628 | 7.34 | 0.69 |
| Com. Ex. 6 | $(Nd_{0.5}Y_{0.2}Ce_{0.3})_2Fe_{14}B$ | 0.5 | 0.6 | 1.0E-02 | 600 | 989 | 873 | 7.43 | 0.90 |
| Com. Ex. 7 | $(Nd_{0.5}Y_{0.1}Ce_{0.4})_2Fe_{14}B$ | 0.5 | 0.8 | 1.0E-02 | 600 | 904 | 656 | 7.50 | 0.89 |
| Com. Ex. 8 | $(Nd_{0.8}Ce_{0.2})_2Fe_{14}B$ | 0.2 | 1.0 | 1.0E-02 | 600 | 1150 | 848 | 7.52 | — |
| Com. Ex. 9 | $(Nd_{0.6}Ce_{0.4})_2Fe_{14}B$ | 0.4 | 1.0 | 1.0E-02 | 600 | 1015 | 640 | 7.54 | — |
| Com. Ex. 10 | $(Nd_{0.5}Ce_{0.5})_2Fe_{14}B$ | 0.5 | 1.0 | 1.0E-02 | 600 | 870 | 601 | 7.56 | — |
| Com. Ex. 11 | $(Nd_{0.4}Ce_{0.6})_2Fe_{14}B$ | 0.6 | 1.0 | 1.0E-02 | 600 | 837 | 509 | 7.56 | — |
| Com. Ex. 12 | $(Nd_{0.3}Ce_{0.7})_2Fe_{14}B$ | 0.7 | 1.0 | 1.0E-02 | 600 | 724 | 469 | 7.57 | — |
| Com. Ex. 13 | $(Nd_{0.5}Y_{0.5})_2Fe_{14}B$ | 0.5 | 0.0 | 1.0E+00 | 800 | 634 | 526 | 7.21 | 0.51 |
| Com. Ex. 14 | $(Nd_{0.5}Y_{0.5})_2Fe_{14}B$ | 0.5 | 0.0 | 1.0E-01 | 800 | 710 | 645 | 7.22 | 0.57 |
| Com. Ex. 15 | $(Nd_{0.5}Y_{0.5})_2Fe_{14}B$ | 0.5 | 0.0 | 5.0E-02 | 800 | 809 | 691 | 7.23 | 0.60 |
| Com. Ex. 16 | $(Nd_{0.5}Y_{0.5})_2Fe_{14}B$ | 0.5 | 0.0 | 2.0E-02 | 800 | 894 | 799 | 7.22 | 0.65 |
| Com. Ex. 17 | $(Nd_{0.5}Y_{0.5})_2Fe_{14}B$ | 0.5 | 0.0 | 5.0E-05 | 800 | 1141 | 903 | 7.21 | 0.90 |
| Com. Ex. 18 | $(Nd_{0.5}Y_{0.5})_2Fe_{14}B$ | 0.5 | 0.0 | 1.0E-02 | 1000 | 928 | 972 | 7.22 | 0.65 |
| Com. Ex. 19 | $(Nd_{0.5}Y_{0.5})_2Fe_{14}B$ | 0.5 | 0.0 | 1.0E-02 | 900 | 1002 | 1049 | 7.21 | 0.76 |
| Com. Ex. 20 | $(Nd_{0.5}Y_{0.5})_2Fe_{14}B$ | 0.5 | 0.0 | 1.0E-02 | 700 | 1005 | 967 | 7.21 | 0.71 |
| Com. Ex. 21 | $(Nd_{0.5}Y_{0.5})_2Fe_{14}B$ | 0.5 | 0.0 | 1.0E-02 | 600 | 959 | 744 | 7.23 | 0.58 |
| Com. Ex. 22 | $(Nd_{0.5}Y_{0.5})_2Fe_{14}B$ | 0.5 | 0.0 | 1.0E-02 | 500 | 846 | 594 | 7.21 | 0.53 |
| Com. Ex. 23 | $(Nd_{0.5}Y_{0.25}Ce_{0.25})_2Fe_{14}B$ | 0.5 | 0.5 | 1.0E-02 | 800 | 896 | 757 | 7.37 | 0.57 |
| Com. Ex. 24 | $(Nd_{0.5}Y_{0.25}Ce_{0.25})_2Fe_{14}B$ | 0.5 | 0.5 | 1.0E-02 | 700 | 1004 | 870 | 7.40 | 0.71 |

TABLE 1-continued

| composition of the main phase grains | x | z | temperature decreasing rate °C./sec | temperature controling zone ±50° C. | $B_r$ mT | $H_{cJ}$ kA/m | density g/cm$^3$ | $Y_{4f}/(Y_{4f}+Y_{4g})$ |
|---|---|---|---|---|---|---|---|---|
| Com. Ex. 25 (Nd$_{0.5}$Y$_{0.25}$Ce$_{0.25}$)$_2$Fe$_{14}$B | 0.5 | 0.5 | 1.0E−02 | 500 | 1012 | 720 | 7.39 | 0.75 |
| Com. Ex. 26 (Nd$_{0.5}$Y$_{0.25}$Ce$_{0.25}$)$_2$Fe$_{14}$B | 0.5 | 0.5 | 1.0E−02 | 400 | 899 | 611 | 7.37 | 0.63 |

As set forth above, the R-T-B based permanent magnet of the present invention is useful for field system of a permanent magnet synchronous rotating machine that is widely used in consumer, industry, transportation equipment and etc.

What is claimed is:

1. A R-T-B based permanent magnet comprising main phase grains with a composition of $(R_{1-x}(Y_{1-z}Ce_z)_x)_2T_{14}B$, where (i) an abundance ratio of $Y_{4f}/(Y_{4f}+Y_{4g})$ satisfies $0.91 \leq Y_{4f}/(Y_{4f}+Y_{4g}) \leq 1.0$ when the Y occupying the 4f site of the tetragonal $R_2T_{14}B$ structure in the main phase grains is denoted as $Y_{4f}$ and the Y occupying the 4g site is denoted as $Y_{4g}$, (ii) R is one or more rare earth element selected from the group consisting of La, Pr, Nd, Sm, Eu, Gd, Tb, Dy, Ho, Er, Tm, Yb and Lu, (iii) T is one or more transition metal element with Fe or Fe and Co as essential elements, and (iv) $0.2 \leq x \leq 0.5$ and $0.0 \leq z \leq 0.5$.

2. A rotating machine comprising the R-T-B based permanent magnet according to claim 1.

3. The R-T-B based permanent magnet according to claim 1, wherein x is 0.5.

4. The rotating machine according to claim 2, wherein x is 0.5.

* * * * *